Figure 1:
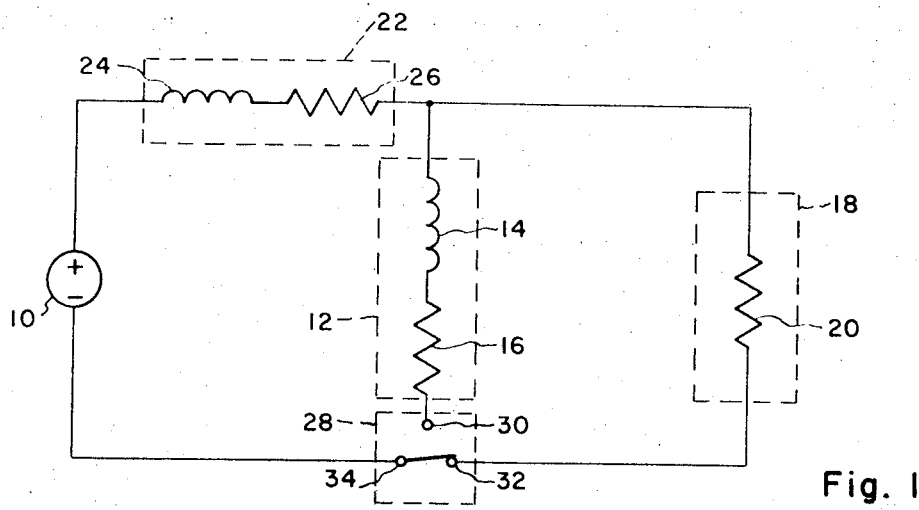

United States Patent [19]
Marino

[11] 3,746,927
[45] July 17, 1973

[54] CIRCUIT FOR SWITCHING CURRENTS THROUGH INDUCTIVE LOADS

[75] Inventor: Francis C. Marino, Huntington, N.Y.

[73] Assignee: Digitronics Corporation

[22] Filed: Jan. 3, 1972

[21] Appl. No.: 214,568

[52] U.S. Cl............ 317/11 B, 307/104, 317/DIG. 6
[51] Int. Cl. ............................................. H02h 7/22
[58] Field of Search ................... 307/104; 323/3, 4, 323/1; 317/DIG. 6, 11 C, 11 B

[56] References Cited
UNITED STATES PATENTS
| | | | |
|---|---|---|---|
| 3,149,244 | 9/1964 | Barnes et al. ....................... | 307/104 |
| 3,177,401 | 4/1965 | Clausing............................. | 317/11 B |
| 2,207,969 | 7/1940 | Burton ................................ | 317/11 B |
| 1,966,077 | 7/1934 | Nyman................................ | 307/104 X |

Primary Examiner—James D. Trammell
Attorney—Daniel M. Rosen

[57] ABSTRACT

A circuit for switching current through an inductive load including a source of potential applying a current to a load having an inductive component, a switch for switching said load from a first condition to a second condition, and an auxiliary inductor connected in series with the switch and load and having an inductive value exceeding the inductive value of the inductive load whereby the current flowing through the auxiliary inductor varies only from the first state condition to the second state condition after switching.

6 Claims, 8 Drawing Figures

Patented July 17, 1973     3,746,927

3 Sheets-Sheet 2

3,746,927

CIRCUIT FOR SWITCHING CURRENTS THROUGH INDUCTIVE LOADS

This invention relates to switching circuits and more particularly to switching arrangement for switching current to an inductive load.

The performance of electro mechanical devices such as stepping motors, solenoids, electromagnetic brakes, etc., is often limited by the time required to switch a specific magnitude of operating current through the inductive coil windings of such devices. In applications of relatively high mechanical speeds, it is essential that the current switching time be reduced as much as it is practical to do so. Such inductive components will generate high inductive voltages whenever the current therethrough is rapidly switched. It is clear that a very rapid switching circuit will require components which can tolerate high magnitudes of voltages generated. The need exists therefore for a circuit which can provide relatively fast switching of inductive loads.

It is therefore the prime object of this invention to provide a novel and unique circuit for switching current levels to an inductive load.

It is the further object of this invention to provide a novel and unique circuit for compensating for the high potential build-up caused by rapid current switching to an inductive load.

The foregoing objects are accomplished by a circuit for maintaining steady current levels through a power source while switching currents through an inductive load, which circuit includes a source for applying a potential to a load including an inductive element and a switch for switching the load from a first steady state condition to a second steady state condition. Also included is a series connected auxiliary inductor having an inductance value exceeding the inductance value of the inductive load whereby the current flowing through the auxiliary inductor varies only from the first steady state condition to the second steady state condition. Voltage limiting circuitry is provided such that the current rise through the switch can be predetermined within proper limits.

Figure 2:
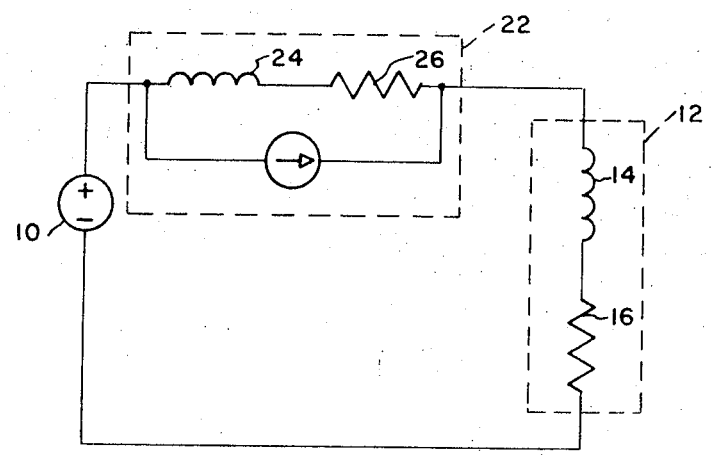
Figure 2A:
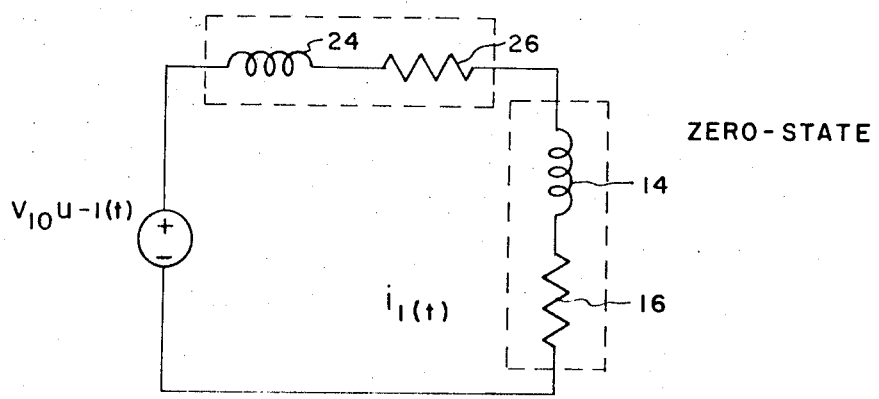
Figure 2B:
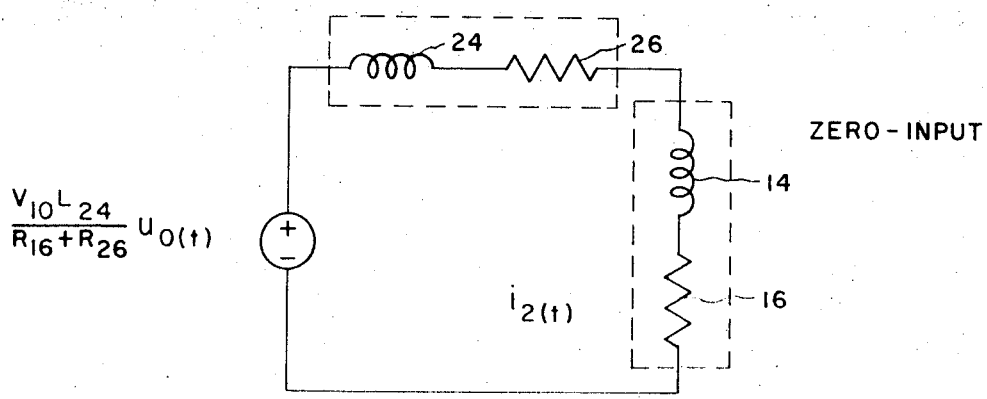
Figure 3:
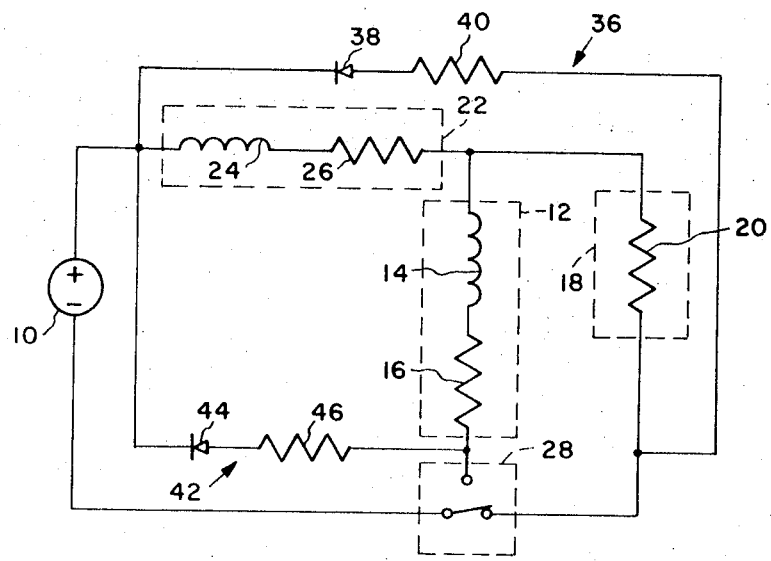
Figure 4:
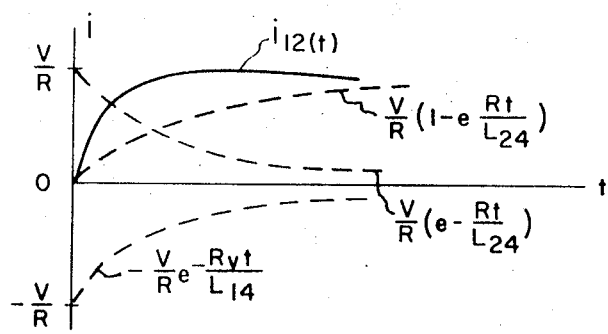
Figure 5:
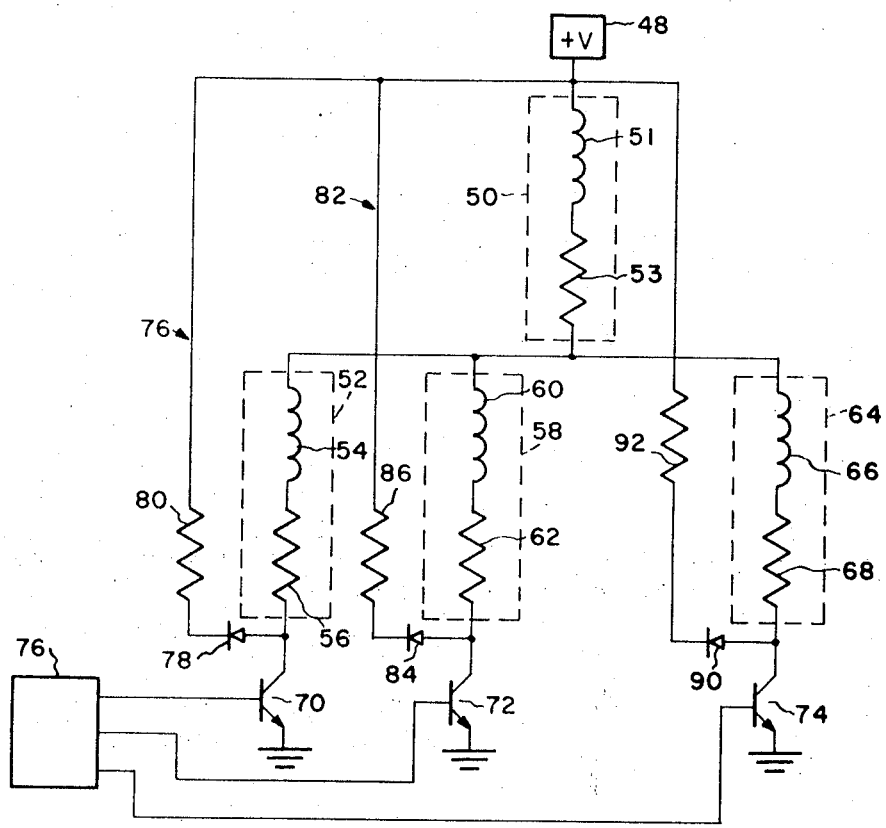
Figure 6:
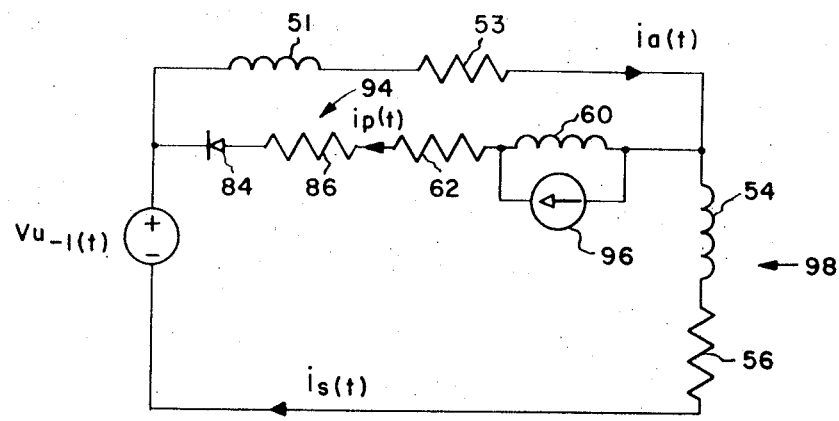

The foregoing objects and brief description of the invention will become more apparent from the following more detailed description, wherein FIG. 1 is a schematic representation of the inventive principle of the present invention, FIG. 2 shows a circuit configuration after switching, FIG. 2A shows the circuit of FIG. 2 for a zero state configuration, FIG. 2B for a zero input configuration, FIG. 3 is a modification of the invention for preventing excessive current flow through the switching device, FIG. 4 is an illustration of the switching wave forms, FIG. 5 is a practical embodiment utilizing the present invention for switching a multiple of loads and FIG. 6 is an equivalent circuit representation of FIG. 5 after switching.

Referring to FIG. 1, a practical circuit configuration is illustrated which provides rapid current switching through significant inductive loads. As shown in the diagram a power supply 10 is connected across a load 12 having an inductor 14 and a resistance 16 associated with said inductance. The power supply 10 is also connected across a load 18 which has a purely resistive component 20. Connecting the source 10 across the loads 12 and 18 is an auxiliary inductor 22 consisting of an inductive component 24 and a resistive component 26. Also included in the circuit is the schematically illustrated switch 28 which is shown as a single pole double throw type having terminals 30 and 32 contacted by a common terminal 34. In the position shown, the switch 28 is closed such that the load 18 has a current through it whereas the load 12 is isolated from the source. For purposes of explanation it is assumed that before the switch transfers from the position shown, sufficient time has elapsed such that a steady state current flows through the circuit as defined by inductor 24, resistance 26, and resistance 20.

At time $t$ equals zero the switch transfers instantly and the equivalent circuit relationship shown in FIG. 2 results. For purposes of convenience, the same reference numerals employed in FIG. 1 will be employed in FIG. 2 where applicable. Thus, the inductive load 12 has been instantaneously switched into the circuit and the resistance load 18 is switched out. Due to the instantaneous switching action, the voltage source 10 and the initial current driven through the auxiliary inductor 24 can be mathematically treated as step and impulse voltage functions, respectively, for determination of the total inductive load current ($i_t$). This is shown in FIGS. 2A and 2B in which the zero-state and zero-input conditions of FIG. 2 are represented, respectively. It follows that: $i_{(t)} = i_{1(t)} + i_{2(t)}$.

For the step function ($U_{-1}(t)$ case), treating the circuit of FIG. 2 as a zero state condition as shown in FIG. 2A, and in accordance with Lenz's law for inductors $E = L(di/dt)$ and Ohm's law for resistors $E = iR$, (V, R and L subscripts refer to element numbers), $$(L_{24} + L_{14})(di_1/dt) + (R_{26} + R_{16})i_1 = V_{10}(U_{-1}(t))$$

solving for $i_{1(t)}$ $$i_{1(t)} = [V_{10} U_{-1}(t)]/(R_{26} + R_{16})(1 - e^{-xt}) \text{ where } x = (R_{26} + R_{16})/(L_{24} + L_{14})$$

For the impulse function ($U_0(t)$) case, treating the circuit of FIG. 2 as a zero-input condition as shown in FIG. 2B;

$$(L_{24} + L_{14}) di_2/dt + (R_{26} + R_{16})i_2 = [L_{24} V_{10} U_0(t)]/(R_{26} + R_{16})$$

solving for $i_2(t)$ $$i_2(t) = [L_{24} V_{10} e^{-xt} U_{-1}(t)]/[(L_{24} + L_{14})(R_{26} + R_{16})]$$

The total response is thus $$i_{(t)} = i_{1(t)} + i_{2(t)} = [V_{10} U_{-1}(t)]/9R_{26} + R_{16})(1 - e^{-xt}) + [L_{24} V_{10} e^{-xt} U_{-1}(t)]/[(L_{24} + L_{14})(R_{26} + R_{16})]$$

If $R$ is defined as $R_{26} + R_{16}$, and $L$ as $L_{24} + L_{14}$ $$i_{(t)} = [V_{10}/R(1 - e^{-Rt/L}) + (L_{24} V_{10} e^{-Rt/L})/LR] U_{-1}(t)$$

In accordance with the invention, the magnitude of $L_{24}$ is designed to exceed the magnitude of $L_{14}$ sufficiently to permit the relationship of $L_{24}/L$ to approach unity. Thus, $$i_{(t)} \cong [V_{10}/R(1 - e^{-Rt/L}) + (V_{10} e^{-Rt/L})] U_{-1}(t) \cong (V_{10}/R) U_{-1}(t)$$

From the foregoing relationship, it will be seen that the total current through the circuit is definable as a step function of current through the inductive load starting a time $t = 0$. Furthermore, as the switch transfers back to its original position, the current through the auxiliary inductor and the auxiliary resistance load 18 will again be $V_{10}/R$ for all time equal to or greater than zero. Consequently, the current through the auxiliary inductor 22 is maintained practically constant while step functions of current are alternatively switched between the resistive load 18 and the inductive load 12.

From examples illustrated above, the inductive voltage developed across the switch 28 would be proportional to the impulse voltage which results from the time derivative of a step function. That is to say, $$e(\text{switch}) = L\ (di_t/dt) = L\ d/dt\ (V/R\ U_{-1}(t)) = L\ V/R\ U_0(t)$$

The actual effect is realized by defining the switch as a relatively high resistive path for the load current. This in turn establishes a finite though very rapid rise time voltage across the switch at the expense of eventually destroying the switch.

The basic principle illustrated in connection with FIG. 1 can be applied to the circuit of FIG. 3 which includes protection for the potential which would be developed by the impulse voltage resulting from the time derivative of the step function. As shown in FIG. 3, where like numerals are again employed for like components with reference to FIG. 1 and 2, a first and second rise time control loop are provided in a circuit arrangement for limiting inductive voltage across the switch 28. The first loop 36 shows a diode 38 connected with a resistance 40 between a first point defined by the junction of the power supply 10 and the auxiliary inductor load 22 and a second point defined as the side of the resistor load 18 remote from the auxiliary inductor load 22. The second rise time control loop 42 includes a diode 44 and a resistance 46 connected between a first point defined by the junction of the power supply 10 and the auxiliary inductor load 22 and a second point on the side of the load inductance 12 remote from the auxiliary inductor 22.

In connection with FIG. 3, it can be shown that the total response of current through the inductor load 12 after the switch 28 has transferred from the position shown can be written as follows:

$$i_{12} \cong [V/R\ (1 - e^{-Rt/L_{24}}) + V/R\ e^{-Rt/L_{14}}]\ U_{-1}(t)$$

where $R = R_{16} + R_{26}$; and $R_V = R_{40} + R_{20} \cong R_{40}$ (since $R_{40} >> R_{20}$).

The significance of the foregoing approximation is shown graphically in FIG. 4, wherein the interaction of the transients upon switching is shown. Each of the foregoing relationships is graphically illustrated in section lines and the summation thereof in a solid line. The summation of the first two terms in the approximation noted above represents the constant current through the auxiliary inductor load 22 whereas the last term of the approximation represents the current of the previously selected branch. Thus, FIG. 4 illustrates that the total current $i_{12}(t)$ will remain at a constant level through the switching of a branch, the transient interactions cancelling.

The resistors 40 and 46 ($\cong R_V$) define the peak inductive voltage developed across the switch and, therefore, the finite fall and rise times of current through the inductive load. For example, if the original inductive load of the inductor 14 is assumed to be 30 millihenries and resistance 16 to have a value of 2 ohms, and the auxiliary inductor is made an order of magnitude larger than the inductive load or for example 300 millihenries, then the approximation above is applicable. In such cases the resistance 26 would have a typical value of 3 ohms. For a steady state current requirement of 1 ampere, the source voltage need only be 5 volts. (1 ampere $\times$ (3+2) ohms = $5_V$)

For a single time constant of, say, 100 microseconds, the resistance $R_V$ representing the previously selected branch (here, $R_{40} + R_{20}$), would be determined by $L/R = 100 \times 10^{-6}$.

$$R = (30 \times 10^{-3})/(100 \times 10^{-6}) = 300\ \text{ohms}$$

Therefore, the peak inductive voltage $E = IR = 1$ ampere $\times$ 300 ohms = 300 volts at $t0$. The power rating of the resistance 40 and 46 depends on the maximum duty cycle average of current flowing through the resistor. For example, if three time constants is taken as the time duration to the end of the current response through the resistor 40 the average time through the resistor 40 per switch cycle may be approximated by the relationship of $V/3R$ or 333 milliamperes. In this case, three time constants represent 300 microseconds. A maximum switching rate of form example 333 cycles per second would define a 10 percent duty cycle where upon the continuous average current through resistor 40 would only be one tenth of the 333 or 33.3 milliamperes. Consequently a one half watt resistor would suffice for this resistance.

The switch 28 in practical use would normally employ transistors controlled by complimentary digital signals. Since these are operated, alternatively, in the saturated or cutoff modes, transistor power dissipation would be trivial. The only criteria which must be established is the transistor tolerance to the reverse collector voltage representing the peak inductive voltage developed. In this case, the transistor must be capable of tolerating a reverse collector voltage of 300 or more volts during the switching intervals. With these ratings a typical transistor which would be satisfactory in operation is one with a reverse collector voltage of 500 volts. Such transistors are readily available.

Referring to the diagram of FIG. 5, a typical circuit application employing the invention is illustrated. In this application, the invention is employed to include any number of comparable inductive loads in application where one inductive load is switched at any time. One such application involves a bidirectional paper tape reader utilizing pinch rollers, solenoids and electro mechanical brakes. As such, each load is an inductive load determined by the nature of each of the devices employed. Referring to FIG. 5 power supply 48 provides a potential through an auxiliary inductor unit 50 which is commonly coupled to each of three inductive loads and includes an inductance 51 and a resistance 53. The first inductive load 52 represents a forward solenoid and includes an inductor 54 and a resistance 56. The second inductive load 58 represents an electromagnetic or mechanical brake actuator and includes an inductor 60 and a resistance 62. The third inductive load 64 represents a reversing solenoid and includes an inductor 66 and a resistance 68.

In each of these cases the switching mechanism is represented by a transistor. Thus the collector junction of a first transistor switch 70 is coupled to the first inductive load 52. The second switch is represented by the transistor 72 which has its collector electrode connected to the inductive load 58. The third switch is represented by the transistor 74 which has its collector electrode connected to the inductive load 64. The switching mechanism operates each of the transistors by means of digital control signals applied by the digital control source 76 which is provided with a plurality of lines each coupled to the respective base electrodes of the transistor switches 70, 72, 74. In operation, by way of example, it may be desired to employ brake power whenever no tape motion exists. Thus, a switching signal would be directed to the circuits represented by the transistor 72, whereas the transistors 70 and 74 would be maintained in their cutoff position. Whenever forward or reverse motion is desired suitable switching pulses are applied to transistor 70 or 74 and the transistor 72 rendered in a cutoff state. Thus it should be apparent that only one of the transistor 70, 72 and 74 is conducting at any one time. Furthermore, only two inductive load branches are involved during any switching interval. For the purposes of limiting the voltage developed across each of the transistor switches, a plurality of rise time control loops are employed. Thus, the first rise time control loop 76 is shown including diode 78 and a resistor 80 series connected between the collector electrode of the transistor 70 and the junction point common to the voltage supply source 48 and the auxiliary inductive unit 50. A second rise time control loop 82 is shown including diode 84 and a resistance 86 series connected between the collector electrode of transistor 72 and the junction point common to the voltage source 48 and the auxiliary inductor unit 50. A third rise time control loop 88 is shown including a diode 90 and a resistance 92 interconnecting the collector electrode of transistor 74 and a junction point common to the voltage source 48 and the auxiliary inductor 50.

Returning to the terminology regarding the two inductive load branches involved in a switching interval, if the two branches are identified as newly selected and previously selected branches the circuit configuration shown in FIG. 6 thus would result during any given switching interval. For purposes of example, the reference numerals employed with regard to FIG. 6 correspond to those shown in FIG. 5 where applicable. Thus, the previously selected branch 94 which may relate to, for example, the brake line unit 58 shown in FIG. 5 and includes the series connection of the diode 84, resistance 86, resistance 62, and brake inductance 60. The brake inductance 60 is illustrated with an equivalent current source 96 coupled there across. The newly selected branch 98 which may by way of example be the forward solenoid is defined as the series combination of the inductance 54 and inductor resistance 56 of the forward solenoid unit 52. The remaining branch includes the auxiliary inductor unit 50 including the auxiliary inductance 51 and the auxiliary inductance resistance 53. An equivalent current source 100 is illustrated across the inductance 51.

The total current flow $i_s(t)$ in this circuit configuration will be given by the summation of the currents in each of the branches as determined by the previous analysis. The current in the auxiliary branch is $i_a(t)$ and in the previously selected branch is $i_p(t)$. It should be noted that if the inductor 60 where equal to zero and the resistance 62 equal to the resistance in the newly selected branch 56, then the total current flow would be that defined in connection with the illustrations of FIG. 3 above since the circuit is within the equivalent. The total current flow is thus:

$$i_s(t) = i_a(t) + i_p(t)$$

$$i_s(t) \cong [V/(R_{53} + R_{56})(1 - 3 -(R_{53}+R_{56})/(L_{51} + L_{54}))$$
$$+ V/(R_{53} + R_{62}) e -(R_{53}+R_{56}) t/L_{51}$$
$$-V/(R_{53} + R_{62}) e -(R_{56}+R_{62}) t/(L_{60}+L_{54})] U_{-1}(t)$$

where the first two terms are $i_a(t)$ and the last term is $i_p(t)$. If $L_{60}=0$, $R_{56}=R_{62}$, $I_{51} \geq I_{54}$ and $R_{53}+R_{56} = R$ the auxiliary indicuctor current $$i_a(t) \cong [V/R(1 - e -Rt/L_{51}) + V/R e -Rt/L_{51}] U_{-1}(t)$$
$$\cong [V/R] U_{-1}(t).$$

It is, therefore, seen that a passive auxiliary inductor can be employed as a constant current source during the rapid switching interval of significant inductive loads. The auxiliary inductor is inherently tolerant of high inductive voltage and its application in the configuration shown permit the use of moderate voltage sources and low power circuit components It should be noted that any variation of the foregoing embodiments may be employed, thus for example the loads shown in the collector circuits in each of the transistors 70, 72, and 74 could be any combination of resistance and inductive components. The invention can be employed when switching from resistance to inductive load or when switching from inductive to resistance loads. Also, further load switching arrangements may be used, the transistors being shown for illustrative purposes only and are not an essential feature of the invention. Further, although a single auxiliary inductor is shown as switching a plurality of inductive loads it is understood that a plurality of auxiliary inductors can also be employed, for any desired combination of load.

It will be apparent to one skilled in the art that the foregoing description is intended as exemplary only and that other variations, possibilities, embodiments and combinations will be apparent to those skilled in the art.

What is claimed is:

1. A circuit for maintaining steady state current levels through a power source while switching currents through inductive loads, comprising first means including said power source and an auxiliary inductor for applying a potential to a load, said load including an inductive portion constituting said inductive load and second means for switching said load from a first steady state condition to a second steady state condition, said auxiliary inductor having an inductance value exceeding the inductance value of said inductive load whereby the current through said auxiliary inductor varies only from said first steady condition to said second steady state condition.

2. The combination of claim 1, wherein the value of said auxiliary inductor exceeds the value of said load inductance by an order of magnitude.

3. A circuit for maintaining steady state current levels through a power source while switching currents through inductive loads, comprising power source means, said power source means including a power source and an auxiliary inductor coupled in series with said power source, switching means for selectively switching second power source means from a first current branch to a second current branch, at least one of said branches including an inductive component, said auxiliary inductor having an inductive component exceeding the inductive component of said one of said branches by an order of magnitude, and first and second rise time control loops respectively coupled across said first and second current branches for limiting the voltage generated across said switching means.

4. The combination of claim 3, where each of said rise time control loops include a series connected diode and resistance, said diode oppositely poled with respect to the polarization of said power source.

5. The circuit of claim 3 wherein each of said switches is a transistor having its emitter collector path coupled serially with each current branch, and wherein each of said branches includes an inductive component, said auxiliary inductor exceeding the inductive component of each branch by at least one order of magnitude.

6. The circuit of claim 5 further including a switching mechanism selectively operating each respective transistor for switching desired current branches into and out of the circuit.

* * * * *

UNITED STATES PATENT OFFICE
CERTIFICATE OF CORRECTION

Patent No. 3,746,927  Dated July 17, 1973

Inventor(s) Francis C. Marino

It is certified that error appears in the above-identified patent and that said Letters Patent are hereby corrected as shown below:

Column 2, line 50, change the "9" to a -- ( --.

Column 3, line 45, delete "$L_{14}$" and insert -- $L_{24}$ --

$\frac{V}{R} \, e^{\frac{-Rt}{L_{14}}}$ -- before $U_{-1}(t)$.

Column 6, line 15, change "indicuctor" to -- inductor --.

Column 6, line 63, insert -- state -- after "steady", first occurrence.

Signed and sealed this 14th day of May 1974.

(SEAL)
Attest:

EDWARD M. FLETCHER, JR.
Attesting Officer

C. MARSHALL DANN
Commissioner of Patents